United States Patent
Maiolani et al.

(10) Patent No.: US 9,417,795 B2
(45) Date of Patent: Aug. 16, 2016

(54) SYSTEM PERFORMANCE CONTROL COMPONENT AND METHOD THEREFOR

(71) Applicants: Mark Maiolani, Glasgow (GB); Gordon James Campbell, Strathaven (GB); Carl Culchaw, Wigan (GB); Alistair James Gorman, Dundee (GB); David McMenamin, Glasgow (GB)

(72) Inventors: Mark Maiolani, Glasgow (GB); Gordon James Campbell, Strathaven (GB); Carl Culchaw, Wigan (GB); Alistair James Gorman, Dundee (GB); David McMenamin, Glasgow (GB)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 130 days.

(21) Appl. No.: 14/261,589

(22) Filed: Apr. 25, 2014

(65) Prior Publication Data

US 2015/0309730 A1 Oct. 29, 2015

(51) Int. Cl.
*G06F 3/06* (2006.01)

(52) U.S. Cl.
CPC ............ *G06F 3/0604* (2013.01); *G06F 3/0629* (2013.01); *G06F 3/0673* (2013.01)

(58) Field of Classification Search
CPC .... G06F 3/0604; G06F 3/0673; G06F 3/0629
USPC .......................................................... 711/154
See application file for complete search history.

(56) References Cited

U.S. PATENT DOCUMENTS

| | | | | |
|---|---|---|---|---|
| 5,566,340 A * | 10/1996 | Stewart | ................ | G06F 1/3203 713/320 |
| 5,710,929 A * | 1/1998 | Fung | ..................... | G06F 1/3203 713/322 |
| 5,799,198 A | 8/1998 | Fung | | |
| 5,815,693 A * | 9/1998 | McDermott | ............. | G06F 1/08 713/501 |
| 2014/0115358 A1* | 4/2014 | Priel | ........................ | G11C 7/22 713/320 |

* cited by examiner

*Primary Examiner* — Michael Alsip (57) ABSTRACT

A system performance control component, and method therefor, for configuring at least one system performance parameter within a signal processing system. The system performance control component is arranged to receive an indication of an address of a memory access performed by at least one signal processing component, compare the received indication of an address of a memory access to at least one address value, and configure at least one system performance parameter based at least partly on the comparison of the received indication of an address of a memory access to at least one address value.

20 Claims, 7 Drawing Sheets

SYSTEM PERFORMANCE CONTROL COMPONENT AND METHOD THEREFOR

FIELD OF THE INVENTION

This invention relates to a system performance control component and method therefor. This invention in particular relates to a system performance control component for configuring at least one system performance parameter within a signal processing system.

BACKGROUND OF THE INVENTION

There is a continual drive to reduce the electrical power consumption of microcontroller based embedded systems while increasing their functional performance. Benefits of reduced electrical power consumption include, but are not restricted to:
  increased operating time for battery powered systems;
  reduction in component costs for power supply circuitry
  improved fuel efficiency for automotive applications where the main powertrain system is used to generate power for the electrical systems (there is increasing focus on trying to achieve best possible vehicle fuel efficiency, with even the small contributions from electrical systems power supply being considered significant);
  reduction in heat generated by the electrical systems allowing the use of cheaper packaging with reduced heat dissipation capabilities (a system with lower power consumption and therefore heat generation may be encased in a plastic or pressed steel enclosure rather than a more expensive die cast finned enclosure).

Many mechanisms can be included in microcontroller devices to help achieve reductions in power consumption. Some of these mechanisms are not typically visible to a user and require no special configuration or control in user developed software. Examples of such mechanisms may be improvements in semiconductor design or manufacturing technology to reduce leakage and switching currents.

Many other mechanisms require specialization of software to achieve best power reductions. Examples of such power control mechanisms include hardware mechanisms to support special low power modes or adjustment of system parameters like voltage or frequency.

To achieve optimum power reductions with prior art mechanisms for power reduction, some software dedicated to control of the power reduction mechanisms is required. This software would have to be tightly integrated within the main application control software (for example automotive engine management software) so that it would be able to determine the application processing requirements and decide when the application could be placed in a reduced power sleep mode, or operate with reduced processing performance. Such a software control component can be developed during the development of the main application software, but causes problems for applications using a significant amount of existing "legacy" code. In some embedded applications including automotive powertrain control applications, a large amount of legacy code is used. Reasons to use unmodified legacy code include:
  to minimize application development costs;
  to reduce the risk of introducing errors;
  to allow use of existing code which is tested but poorly documented making modifications difficult; and
  to minimize the need for software re-certification In light of the above, the development of new power control mechanisms to allow optimum use of power reduction techniques is required to minimise (and preferably avoid altogether) the requirement for software modifications.

SUMMARY OF THE INVENTION

The present invention provides a system performance control component and a method of configuring at least one system performance parameter within a signal processing system as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

The present invention will now be described with reference to the accompanying drawings in which there are illustrated examples of a method and apparatus for configuring system performance parameters within a signal processing system. However, it will be appreciated that the present invention is not limited to the specific examples herein described and various alternations and modifications may be made without detracting from the inventor concept.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

In accordance with some examples of a first aspect of the present invention, there is provided a system performance control component for configuring at least one system performance parameter within a signal processing system, The system performance control component being arranged to receive an indication of an address of a memory access performed by at least one signal processing component, compare the received indication of an address of a memory access to at least one address value, and configure at least one system performance parameter based at least partly on the comparison of the received indication of an address of a memory access to at least one address value.

In this manner, system performance may be dynamically controlled based on, for example, address to which data and/or instruction fetches are made, enabling scaling of clock frequencies and/or power supply during idle time, and thus power consumption may be significantly reduced. Conversely, areas of code that are particularly performance sensitive (for example, computationally intensive routines) can be identified and selected for performance boost. Furthermore, no special power mode control software is required since the system performance parameters are able to be automatically configured in response to execution of existing software based on address of memory accesses etc. Consequently, no software changes are required if address compare region is controlled/configured by, for example, flash configuration.

In some optional embodiments, the system performance control component may comprise at least one address comparison component arranged to:
  receive the indication of an address of a memory access performed by the at least one signal processing component;
  compare the received indication of an address of a memory access to at least one address value; and
  output at least one address match signal comprising an indication of whether the received indication of an address of a memory access is a match to at least one criteria, the at least one criteria comprising at least one from a group comprising at least one of:
  whether the indication of an address of a memory access matches the at least one address value;
  whether the indication of an address of a memory access is less than the at least one address value;
  whether the indication of an address of a memory access is greater than the at least one address value;
  whether the indication of an address of a memory access is within an address range at least partly defined by the at least one address value; and
  whether the indication of an address of a memory access is outside an address range at least partly defined by the at least one address value.

In some optional embodiments, the at least one comparison component may comprise at least one programmable register for storing the at least one address value.

In some optional embodiments, the at least one comparison component may form a part of at least one of:
  a memory management unit of the integrated circuit device;
  a memory protection unit of the integrated circuit device; and
  a debug module for the at least one integrated circuit device.

In some optional embodiments, the at least one comparison component may be arranged to hold the address match signal constant during periods of no memory accesses activity by the at least one signal processing component.

In some optional embodiments, the system performance control component may further comprise at least one performance configuration component arranged to:
  receive the at least one address match signal output by the at least one address comparison component; and
  configure at least one system performance parameter based at least partly on the address match signal output by the at least one address comparison component.

In some optional embodiments, the at least one performance configuration component may be arranged to configure at least one system performance parameter to:
  improve performance of at least a part of the integrated circuit device, if the address match signal comprises a first indication; and
  reduce power consumption of at least a part of the integrated circuit device, if the address match signal comprises a second indication.

In some optional embodiments, the at least one performance configuration component may be arranged to:
  monitor the address match signal output by the at least one address comparison component;
  determine a duty cycle for the address match signal; and
  configure at least one system performance parameter based at least partly on the determined duty cycle for the address match signal.

In some optional embodiments, the at least one system performance control component may be arranged to configure at least one system performance parameter based at least partly on:
  whether the indication of an address of a memory access matches the at least one address value;
  whether the indication of an address of a memory access is less than the at least one address value;
  whether the indication of an address of a memory access is greater than the at least one address value;
  whether the indication of an address of a memory access is within an address range at least partly defined by the at least one address value; and
  whether the indication of an address of a memory access is outside an address range at least partly defined by the at least one address value.

In some optional embodiments, the system performance control component may be arranged to configure at least one system performance parameter from a group comprising at least one of:
  at least one frequency control parameter for at least one clock signal within the integrated circuit device;
  at least one clock gating control parameter;
  at least one power supply voltage level control parameter;
  at least one power supply gating control parameter; and
  at least one power mode selection parameter.

In some optional embodiments, the indication of an address of a memory access performed by the at least one signal processing component may comprise an indication of an address of at least one of:
  a data fetch performed by the at least one signal processing component; and
  an instruction fetch performed by the at least one signal processing component.

In some optional embodiments, the system performance control component may be implemented within an integrated circuit device comprising at least one die within a single integrated circuit package.

In some optional embodiments, the system performance control component may be implemented within at least one of:
- a microcontroller integrated circuit device;
- a microprocessor integrated circuit device; and
- a system on chip, SoC, integrated circuit device.

In accordance with some examples of a second aspect of the present invention, there is provided a method of configuring at least one system performance parameter within a signal processing system. The method comprises receiving an indication of an address of a memory access performed by at least one signal processing component, comparing the received indication of an address of a memory access to at least one address value, and configuring at least one system performance parameter based at least partly on the comparison of the received indication of an address of a memory access to at least one address value.

Figure 1:
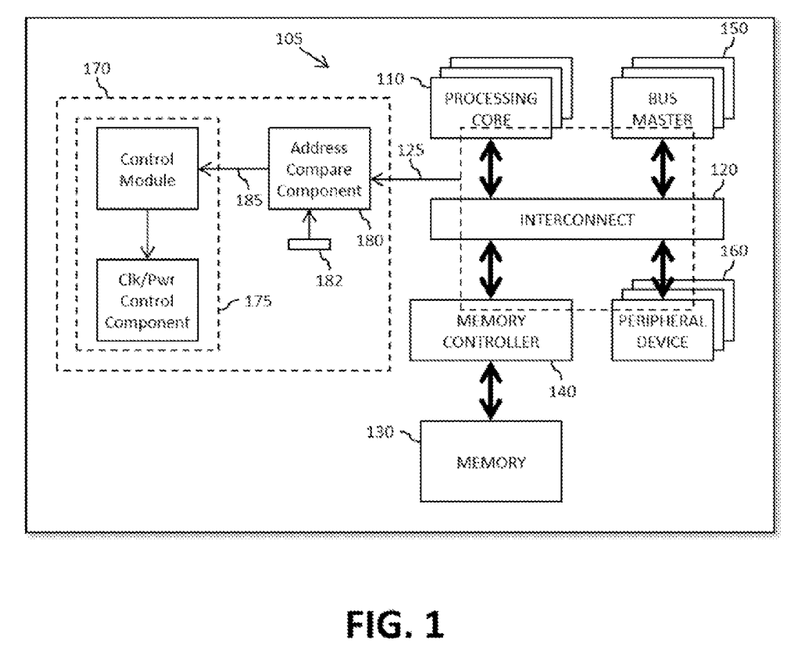
FIG. 1 illustrates a simplified block diagram of an example of a signal processing integrated circuit (IC) device.

Referring now to FIG. 1, there is illustrated a simplified block diagram of an example of a signal processing integrated circuit (IC) device 100. The signal processing IC device 100 may be implemented within an integrated circuit device comprising at least one die within a single integrated circuit package, and may comprise any form of signal processing IC device such as, by way of example only, a microcontroller unit (MCU) device, a microprocessor device, a system on chip (SoC) device, etc.

In the illustrated example, the signal processing IC device 100 comprises (at least part of) a signal processing system 105 comprising one or more signal processing components, such as the processing cores 110. The signal processing IC device 100 further comprises at least one interconnect component 120, for example comprising one or more buses and/or one or more crossbar switches. The interconnect component 120 is arranged to connect various components within the signal processing IC device 100 and allow the transfer of data etc. there between. In particular, the interconnect component 120 is arranged to connect the processing core(s) 110 to one or more memory elements, such as the memory element 130 which in the illustrated example is operably coupled to the interconnect component 120 via a memory controller component 140. The signal processing IC device 100 may further comprise one or more additional bus master devices such as indicated generally at 150, for example comprising Direct Memory Access (DMA) modules or the like, and/or one or more additional peripheral devices such as indicated generally at 160.

The signal processing IC device 100 further comprises a system performance control component 170 for configuring at least one system performance parameter within the signal processing system 105 of the signal processing IC device 100. The system performance control component 170 is arranged to receive an indication 125 of an address of a memory access performed by at least one the processing cores 110, compare the received indication of an address of a memory access to at least one address value, and configure at least one system performance parameter based at least partly on the comparison of the received indication of an address of a memory access to at least one address value.

In accordance with some examples, and as illustrated in FIG. 1, the system performance control component 170 may comprise one or more address comparison components 180 arranged to receive the indication 125 of an address of a memory access performed by the processing core(s) 110, compare the received indication 125 of an address of a memory access to one or more address values, and output an address match signal 185 based on the comparison of the received indication 125 of an address of a memory access performed by the processing core(s) 110 to the address values. For example, the address comparison component(s) 180 may comprise one or more comparators (not shown) arranged to compare the received indication 125 of an address of a memory access to one or more address values stored within a programmable register 182 or other form of memory element. The received indication 125 of an address of a memory access performed by the processing core(s) 110 may comprise the full memory address of the memory access, a partial address (e.g. comprising a lower resolution part of the full memory address), or some other indication capable of differentiating between different areas of memory being accessed by the processing core(s).

The comparator address value(s) used for comparison, for example stored within programmable register 182 in the example illustrated in FIG. 1, may be configured by startup software or by some automated means such as flash memory data. The comparator address values may be chosen by, for example, an application developer using analysis of the application software to categorize sections of code into two or more classes, for example such as: "maximum performance required", "reduced performance requirement, maximum power reduction requirement", etc.

The address comparison components 180 may compare the received indication 125 of an address of a memory access to the comparator address value(s), and output an address match signal 185 comprising an indication of whether the received indication 125 of an address of a memory access is a match to one or more criteria. Such criteria may comprise, for example, one or more of:
- whether the indication of an address of a memory access matches the at least one address value;
- whether the indication of an address of a memory access is less than the at least one address value;
- whether the indication of an address of a memory access is greater than the at least one address value;
- whether the indication of an address of a memory access is within an address range at least partly defined by the at least one address value; and
- whether the indication of an address of a memory access is outside an address range at least partly defined by the at least one address value.

Many existing signal processing IC devices already contain address comparator hardware, for example in the form of debug address comparators used during application development, which during normal operation is unused, and/or Memory Management Units (MMUs) or Memory Protection Units (MPUs) which may also include address comparators used to define memory locations for protection. The use of such hardware comparator components already present within existing signal processing IC device designs to implement the present invention would avoid or minimise added silicon and design cost. As such, in some examples of the present invention it is contemplated that the address comparison component 180 may form a part of an MMU, an MPU and/or a debug module of the signal processing IC device 100.

In accordance with some examples, and as illustrated in FIG. 1, the system performance control component 170 may further comprise at least one performance configuration component 175 arranged to receive the address match signal 185 output by the address comparison component 180 and configure at least one system performance parameter based at least partly on the address match signal output by the at least one address comparison component.

In some examples, the performance configuration component 175 may be arranged to configure one or more system performance parameter(s) to improve performance of at least a part of the integrated circuit device, if the address match signal comprises a first indication, and reduce power consumption of at least a part of the integrated circuit device, if the address match signal comprises a second indication.

Figure 2:
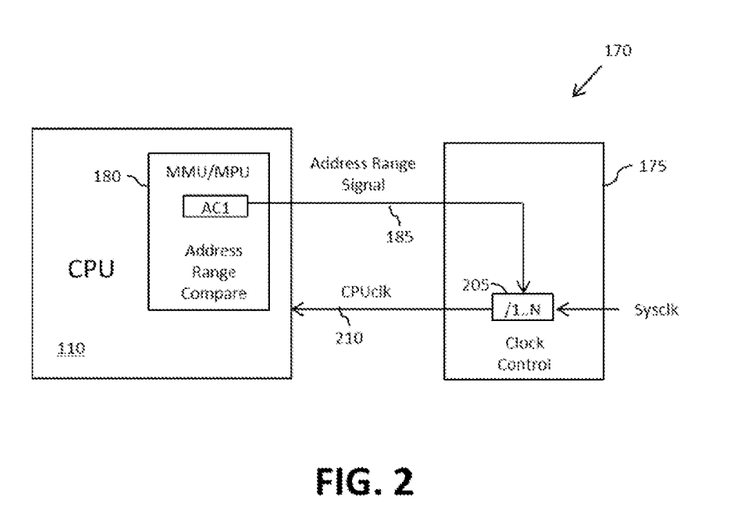
FIG. 2 illustrates a simplified block diagram of an example of a performance configuration component.

FIG. 2 illustrates a simplified example of the performance configuration component 175 arranged to receive the address match signal 185 output by the address comparison component 180, which in the example illustrated in FIG. 2 forms part of an MMU/MPU, and configure at least one system performance parameter based at least partly on the address match signal output by the at least one address comparison component. In particular in the example illustrated in FIG. 2, the performance configuration component 175 is arranged to configure a divider 205 which scales a main processor clock signal 210. Such configuration may be achieved by way of direct control of the divider scaling by the address match signal 185, as illustrated in FIG. 2. In this simple example, the address compare may typically be arranged to only monitor instruction fetches, with the address comparison component 180 arranged to hold the address match signal 185 constant during data fetches and periods with no bus activity.

Figure 3:
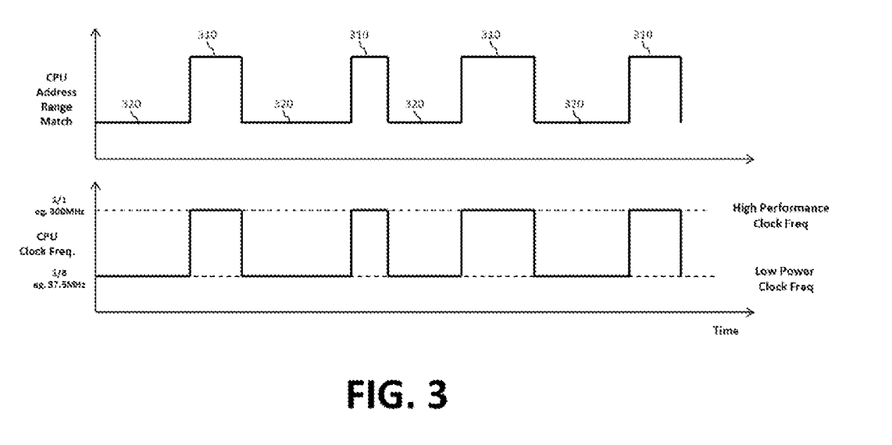
FIG. 3 illustrates a simplified timing diagram for the system performance configuration arrangement of FIG. 2.

FIG. 3 illustrates a simplified timing diagram for the system performance configuration arrangement of FIG. 2. For application code execution etc., indicated generally at 310, the main processor clock signal 210 may be configured to operate at full 1:1 frequency. For sections of code identified as the main 'idle' or 'background' task (and as defined by address values configured within the programmable register 182), indicated generally at 320, the main processor clock signal 210 may be scaled by the performance configuration component 175 to a lower level (for example ⅛) upon instruction fetches to the area of memory containing such code being detected by the address comparison component 180. This automatically reduces the mean power draw during idle/background task execution while still providing full performance during main application execution.

In this manner, invention works by making use of address comparators to automatically control system performance features during application operation. It will be appreciated that the use of simple hardware configuration components in this manner allows a very low cost implementation, and very fast response to the address compare signal, so that there would be only a very short delay between an address range comparator trigger and subsequent change in operating characteristics. Such a short delay could not be achievable with software based control.

In some alternative examples, the performance configuration component 175 may be arranged to monitor the address match signal 185 output by the address comparison component 180, determine a duty cycle for the address match signal, and configure one or more system performance parameter(s) based at least partly on the determined duty cycle for the address match signal.

Figure 4:
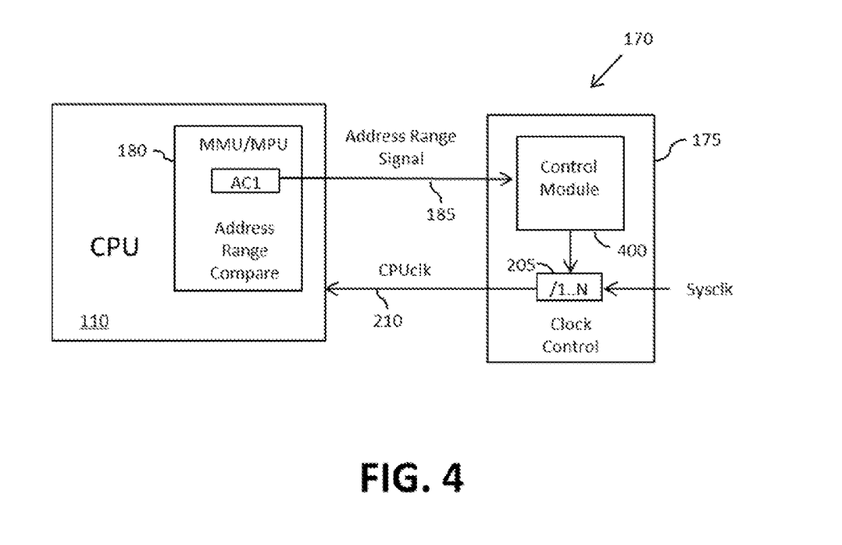
FIG. 4 illustrates a simplified block diagram of an alternative example of a performance configuration component.

FIG. 4 illustrates a simplified alternative example of the performance configuration component 175 arranged to receive the address match signal 185 output by the address comparison component 180, and configure at least one system performance parameter based at least partly on a determined duty cycle for the address match signal. In particular in the example illustrated in FIG. 2, the performance configuration component 175 comprises control module 400 arranged to monitor the address match signal 185 output by the address comparison component 180 and determine a duty cycle for the address match signal 185. For example, the control module 400 may be arranged to count over n clock cycles the number of clock cycles for which the address match signal 185 comprises a particular logical state (e.g. a 'high' state or a 'low' state). The control module 400 is further arranged to configure a divider 405 which scales a main processor clock signal 210. In this manner, the address range compare function may be used to scale the main processor clock signal 210 over time until the inferred processor workload reaches a defined target value. Although a more complex implementation than that of FIGS. 2 and 3, this example of FIG. 4 helps to avoid power spikes due to large and rapid swings in clock frequency.

Figure 5:
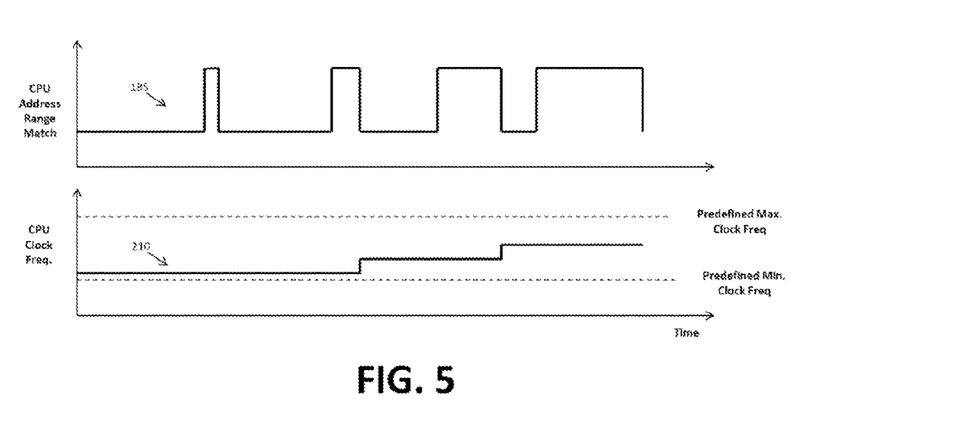
FIG. 5 illustrates a simplified timing diagram for the system performance configuration arrangement of FIG. 4.

FIG. 5 illustrates a simplified timing diagram for the system performance configuration arrangement of FIG. 4. The address match signal 185 is monitored, and its duty cycle periodically (e.g. each n clock cycles) determined. The duty cycle may then be compared to a threshold value. If the duty cycle is below the threshold value, it may be inferred that the processor core 110 comprises, say, a high workload. Accordingly, the control module 400 may configure the divider 405 to increase the frequency of the main processor clock signal 210 to increase performance. Conversely, if the duty cycle value is above the threshold value, it may be inferred that the processor core 110 comprises, say, a low workload. Accordingly, the control module 400 may configure the divider 405 to reduce the frequency of the main processor clock signal 210 to reduce power consumption. In the example illustrated in FIG. 5, the control module 400 configures the divider 405 to incrementally ramp up frequency of the clock signal 210 in response to increasing processor load inferred by the duty cycle of the address match signal 185.

Figure 6:
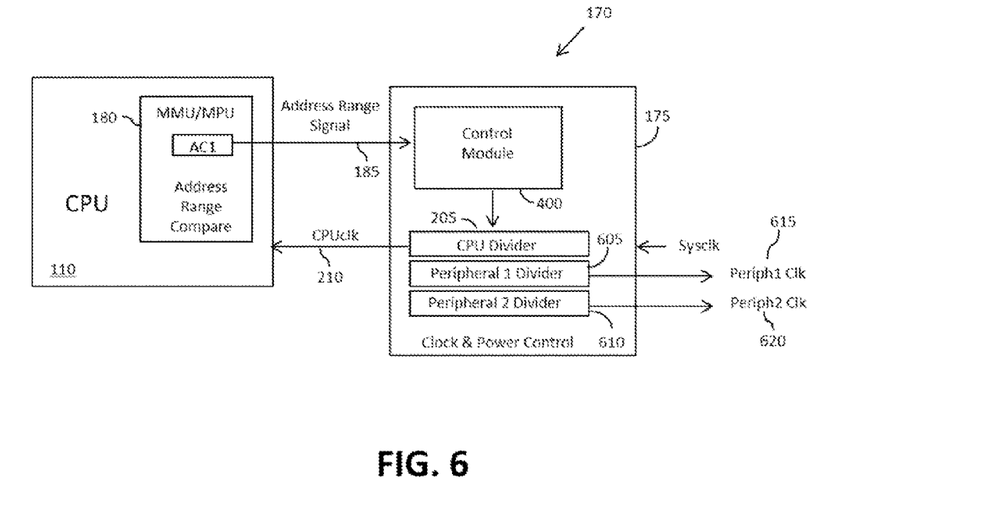
FIG. 6 illustrates a simplified block diagram of a further alternative example of a performance configuration component.

In the examples hereinbefore described with reference to FIGS. 2 to 5, the system performance control component 170 has been arranged to configure a system performance parameter in the form of a frequency of a main processor clock signal 210 based on an address of a memory access performed by a processing core 110. However, it will be appreciated that the present invention is not limited to configuring such a system performance parameter based on an address of a memory access performed by just a processing core 110. For example, and as illustrated in FIG. 6, it is contemplated that the system performance control component 170 may additionally/alternatively be arranged to configure clock signals for components other than a processing core, such as one or more peripheral devices 160 (FIG. 1) and/or memory elements 130. For example, and as illustrated in FIG. 6, the control module 400 may be arranged to, collectively or individually, configure one or more dividers for scaling processing core clock signals, such as divider 205 for scaling main processor clock signal 210 and/or one or more dividers for scaling clock signals for peripheral devices, such as dividers 605, 610 for scaling peripheral device clock signals 615, 620. In this manner, address range matches may be used to adjust clock signals to other resources within the signal processing system 105, for example analogue to digital converters, flash memories, timers etc.

Figure 7:
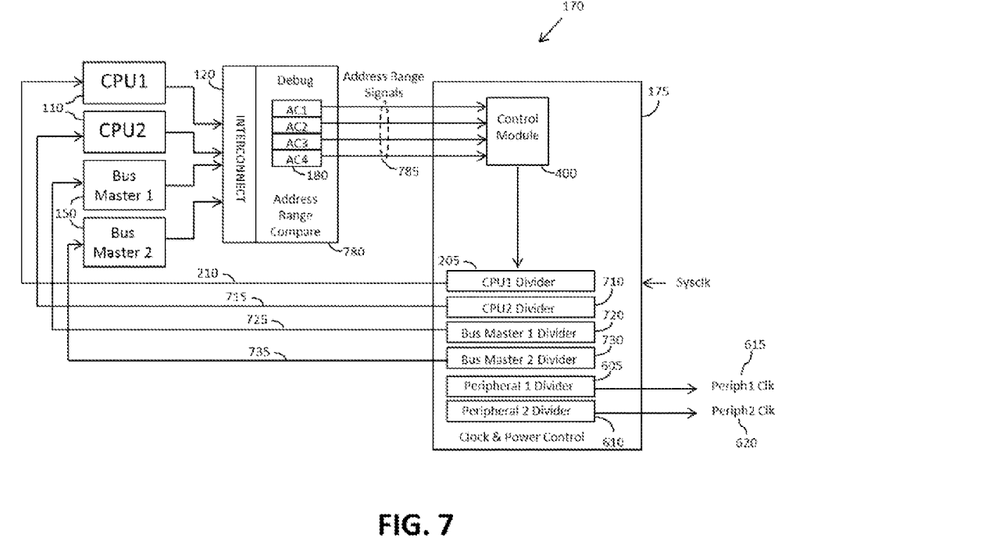
FIG. 7 illustrates a simplified block diagram of a still further alternative example of a performance configuration component.

Furthermore, and as illustrated in FIG. 7, it is contemplated that the system performance control component 170 may additionally/alternatively be arranged to receive indications of addresses of memory accesses performed by multiple processor cores 110 and/or one or more other bus master bus master devices 150. In the example illustrated in FIG. 7, a plurality of address comparison components 180 are implemented within a debug component 780 of the signal processing IC device 100. The debug component 780 is operably coupled to the interconnect 120, and the address comparison components 180 are arranged to receive indications of addresses of memory accesses performed by, in the illustrated example, two processing cores 110 and two further bus master devices 150, and to output one or more address match signal 785. For example, each address comparison component 180 may be arranged to receive an indication of an address of a memory access performed by one of the processing cores 110 or master devices 150, and to output an address match signal 785 corresponding to the respective processing core 110/master device 150. As also illustrated in FIG. 7, the performance configuration component 175 may be arranged to individually configure clock signals for the processing cores 110 and bus master devices 150 based on the received address match signals 785. For example, and as illustrated in FIG. 7, the control module 400 may be arranged to individually configure dividers 205, 710, 720, 730 for scaling core clock signals 210, 715, 725, 735 for the processing cores 110 and bus master devices 150 based on the received address match signals 785.

Figure 8:
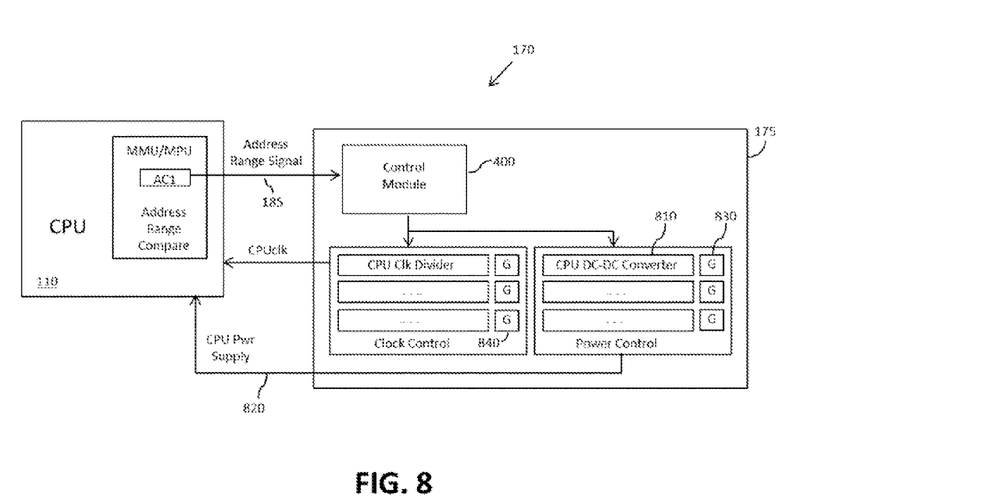
FIG. 8 illustrates a simplified block diagram of a still further alternative example of a performance configuration component.

In the examples hereinbefore described with reference to FIGS. 2 to 7, the system performance control component 170 has been arranged to configure system performance parameters in the form of a frequency of one or more clock signal based on one or more address(es) of memory access(es) performed by one or more processing cores 110 and/or one or more bus master devices 150. However, it will be appreciated that the present invention is not limited to configuring clock signals based on one or more address(es) of memory access(es). For example, and as illustrated in FIG. 8, it is contemplated that the system performance control component 170 may additionally/alternatively be arranged to configure voltage/power supplies for components within the signal processing system 105. For example, and as illustrated in FIG. 8, the control module 400 may be arranged to, collectively or individually, configure one or more voltage/power supplies, such as the CPU DC to DC converter indicated at 810, for scaling the voltage of a power supply signal for one or more components of the signal processing system 105, such as the power supply signal 820 of the processor core 110 indicated in FIG. 8.

It is further contemplated that the system performance control component 170 is not limited to configuring system performance parameters by way of the scaling of clock signal frequencies and/or power supplies. In some examples, the system performance control component 170 may additionally/alternatively be arranged to configure/control the gating clock signals and/or power supply signals. For example, and as illustrated in FIG. 8, the system performance control component 170 may be arranged to configure/control clock gating components, such as clock gating component 840 and/or power supply gating components, such as power supply gating component 830. In this manner, a power consumption may be reduced as required resources would only be clocked or powered up (through being un-gated) as particular sections of application code are executed.

Thus, in some examples of the present invention it is contemplated that the system performance control component 170 is arranged to configure at least one system performance parameter from a group comprising at least one of:
 at least one frequency control parameter for at least one clock signal within the integrated circuit device;
 at least one clock gating control parameter;
 at least one power supply voltage level control parameter;
 at least one power supply gating control parameter; and
 at least one power mode selection parameter.

In a conventional system, applications typically run significantly below 100% processor loading due to the need for a safety margin to compensate for to uneven processor loading over time, and the need to support future added functionality. In such a conventional system, operational processor loading may be as low as 60%. Advantageously, by scaling the clock frequency and/or power supply during idle time as hereinbefore described, power consumption may be significantly reduced. Conversely, areas of code that are particularly performance sensitive (for example, computationally intensive routines) can be identified and selected for performance boost. Furthermore, no special power mode control software is required since the system performance control component 170 is able to automatically configure performance parameters in response to execution of existing software based on address of memory accesses etc. Consequently, no software changes are required if address compare region is controlled/configured by, for example, flash configuration. As a result, the present invention is particular beneficial when large amounts of unmodified legacy code are required to be supported. Furthermore, the use of hardware based comparator/control components enables fast switching between performance modes, which would not be possible under software controlled techniques.

Figure 9:
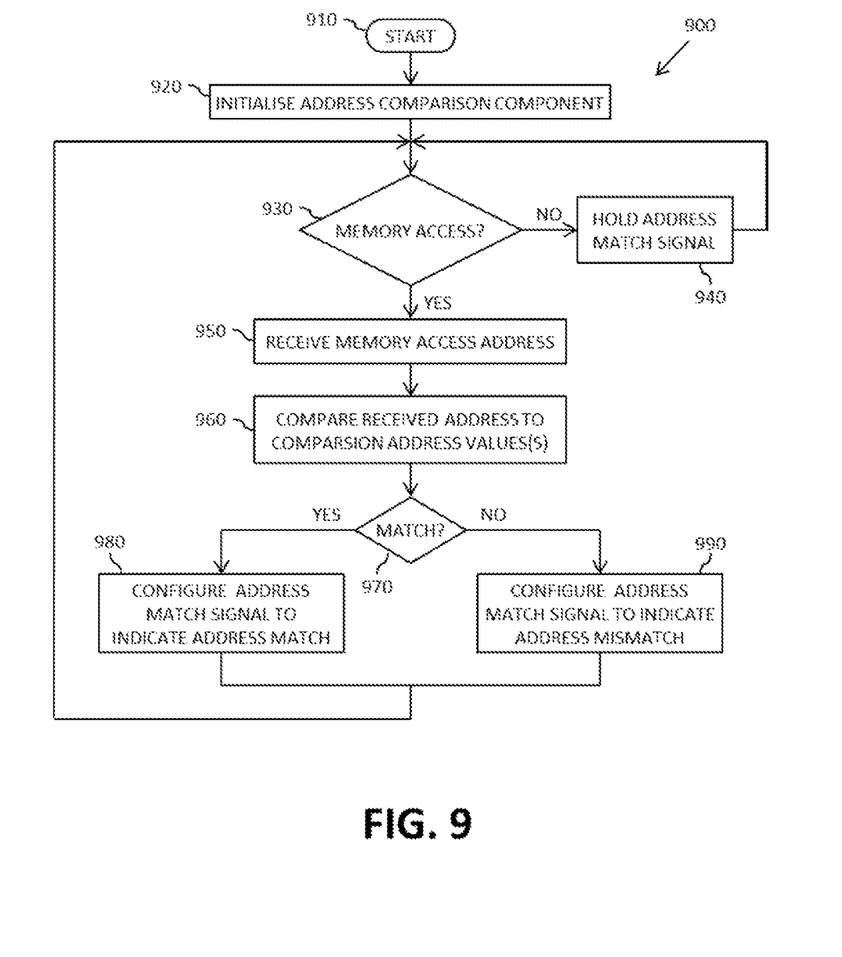
FIGS. 9 to 11 illustrate simplified flowcharts of examples of a method of configuring system performance parameters within a signal processing system.

Referring now to FIG. 9, there is illustrated a simplified flowchart 900 of an example of a first part of a method of configuring system performance parameters within a signal processing system, such as may be implemented within system performance control component 170 of FIG. 1 and in particular within the address comparison components 180 of FIG. 1. The part of the method of FIG. 9 starts at 910, and moves on to 920 where an address comparison component is initialised. For example, such initialisation may comprise, say, loading one or more address values into the programmable register 182, and initialising the address match signal 185 to, for example, a 'non-match' state. Next, at 930, it is determined whether, in the illustrated example, a memory access (e.g. a data or instruction fetch) request occurred. If no such memory access activity has occurred, the method illustrated in FIG. 9 moves on to 940 where the address match signal is held in its current state. The method then loops back to 930, and continuous looping through 930 and 940 until a memory access occurs, at which point the method moves on to 950 where the method comprises receiving an indication of an address of the memory access. Next, at 960, the received indication of the memory access address is compared to at least one comparison address values, for example such as those stored in the programmable register 182 in FIG. 1. It is then determined whether the received indication of the memory access address is a match to one or more criteria. Such criteria may comprise, for example, one or more of:
 whether the indication of an address of a memory access matches the at least one comparison address value;
 whether the indication of an address of a memory access is less than the at least one comparison address value;
 whether the indication of an address of a memory access is greater than the at least one comparison address value;
 whether the indication of an address of a memory access is within an address range at least partly defined by the at least one comparison address value; and
 whether the indication of an address of a memory access is outside an address range at least partly defined by the at least one comparison address value.

If it is determined that the received indication of the memory access address is a match to one or more of the criteria, the method moves on to 980, where the address match signal is configured to indicate an address match. Conversely, if it is determined that the received indication of the memory access address is not a match to the criteria, the method moves on to 990, where the address match signal is configured to indicate an address mismatch.

The method then loops back to 930.

Figure 10:
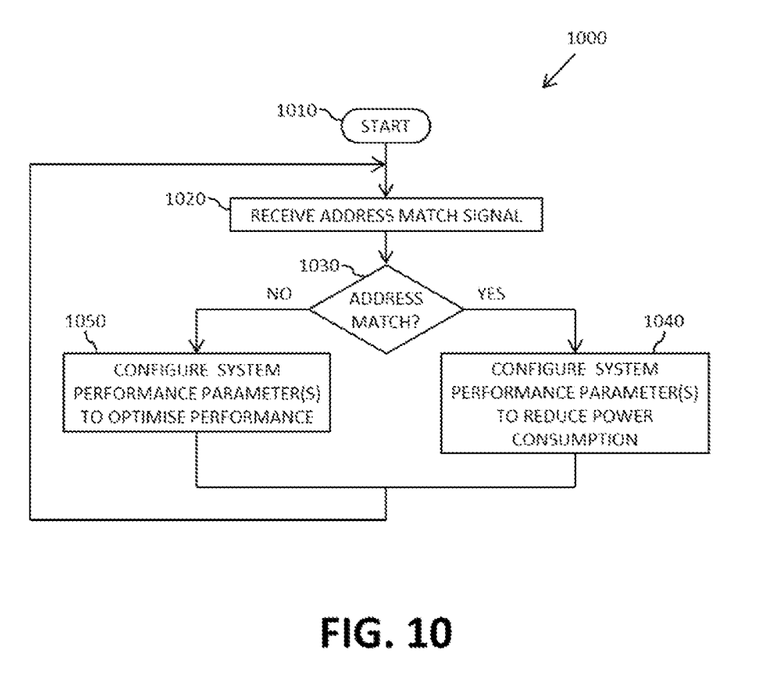

Referring now to FIG. 10, there is illustrated a simplified flowchart 1000 of an example of a second part of a method of configuring system performance parameters within a signal processing system, such as may be implemented within system performance control component 170 of FIG. 1, and in particular within the performance configuration component 175 of FIG. 1. The part of the method of FIG. 10 starts at 1010 and moves on to 1020, where an address match signal is received comprising an indication of whether a received indication of an address of a memory access is a match to at least one criteria, such as the address match signal 185 illustrated in FIG. 1. Next, at 1030, it is determined whether the received address match signal comprises an indication of a match to the at least one criteria. If it is determined that the received address match signal comprises an indication of a match, the method moves on to 1040 where, in the illustrated example, one or more system performance parameters are configured to reduce power consumption. Conversely, if it is determined that the received address match signal comprises an indication of a mismatch, the method moves on to 1050 where, in the illustrated example, one or more system performance parameters are configured to optimise performance. The system performance parameters configured at 1040 and 1050 may comprise, by way of example, one or more of:

one or more frequency control parameters for at least one clock signal;
one or more clock gating control parameters;
one or more power supply voltage level control parameters;
one or more power supply gating control parameters; and/or
one or more power mode selection parameters.

The method then loops back to 1020.

Figure 11:
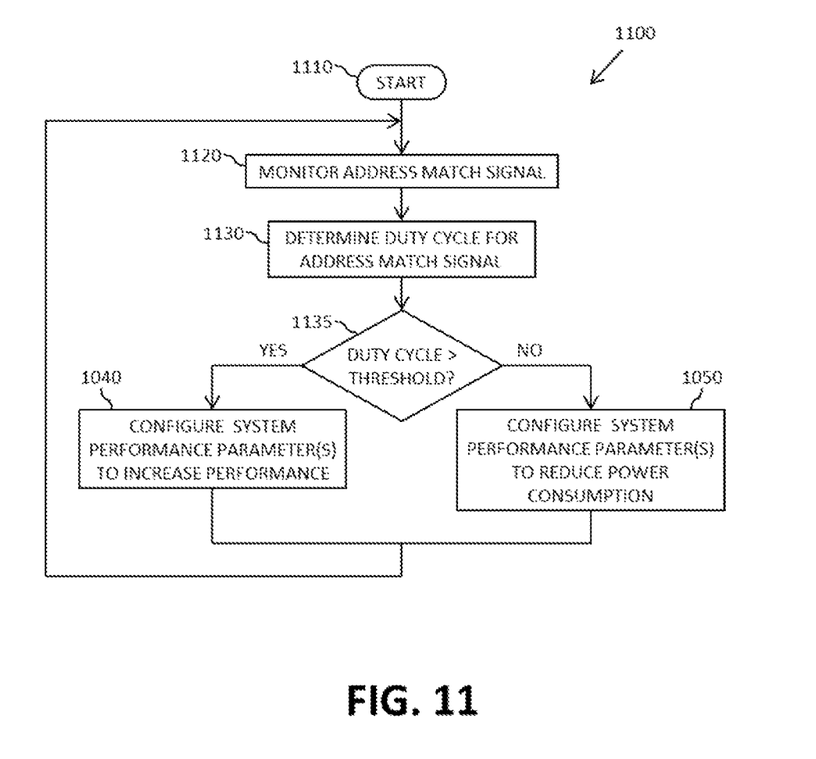

Referring now to FIG. 11, there is illustrated a simplified flowchart 1100 of an alternative example of the second part of the method of configuring system performance parameters within a signal processing system, such as may be implemented within system performance control component 170 of FIG. 1, and in particular within the performance configuration component 175 of FIG. 1. This second part of the method of FIG. 11 starts at 1110 and moves on to 1120, where an address match signal comprising an indication of whether a received indication of an address of a memory access is a match to at least one criteria is monitored, such as the address match signal 185 illustrated in FIG. 1. Next, at 1130, a duty cycle for the monitored address match signal is determined. For example, the method may comprise counting over n clock cycles the number of clock cycles for which the address match signal 185 comprises a particular logical state (e.g. a 'high' state or a 'low' state). The method then moves on to 1135, where it is determined whether the determined duty cycle for the received address match signal is greater than a threshold value. If it is determined that the determined duty cycle for the received address match signal is greater than the threshold value, the method moves on to 1140 where, in the illustrated example, one or more system performance parameters are configured to increase performance. Conversely, if it is determined that the determined duty cycle for the received address match signal is not greater than the threshold value, the method moves on to 1150 where, in the illustrated example, one or more system performance parameters are configured to reduce power consumption. As in the previous example, the system performance parameters configured at 1140 and 1150 may comprise, by way of example, one or more of:

one or more frequency control parameters for at least one clock signal;
one or more clock gating control parameters;
one or more power supply voltage level control parameters;
one or more power supply gating control parameters; and/or
one or more power mode selection parameters.

The method then loops back to 1120.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the illustrated examples, the address compare components 185 and performance configuration components 175 have been illustrated and described as discrete components. Furthermore, in some of the illustrated examples, control modules 400 have been illustrated and described as being distinct from components arranged to implement the various functional parameter configurations, such as the various clock dividers 205, 710, 720, 730 and/or power supply components 810 and power supply/clock gating components 830, 840. However, it will be appreciated that these various components may equally be implemented in a more integrated manner with respect to one another.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A system performance control component for configuring at least one system performance parameter within a signal processing system; the system performance control component comprising:
    an address comparison component to receive an indication of an address of a memory access performed by at least one signal processing component, to
    compare the received indication of an address of a memory access to at least one address value, and to output an address match signal comprising an indication of whether the received indication of the address of the memory access is a match to a criteria; and
    a performance configuration component to communicate with the address comparison component, the performance configuration component to monitor the address match signal output by the at least one address comparison component, to determine a duty cycle for the address match signal, and to configure at least one system performance parameter based at least partly on the determined duty cycle for the address match signal.

2. The system performance control component of claim 1, wherein to the criteria is at least one of a group comprising:
    whether the indication of an address of a memory access matches the at least one address value;
    whether the indication of an address of a memory access is less than the at least one address value;
    whether the indication of an address of a memory access is greater than the at least one address value;
    whether the indication of an address of a memory access is within an address range at least partly defined by the at least one address value; and
    whether the indication of an address of a memory access is outside an address range at least partly defined by the at least one address value.

3. The system performance control component of claim 2, wherein the address comparison component comprises at least one programmable register for storing the at least one address value.

4. The system performance control component of claim 2, wherein the address comparison component forms a part of at least one of:
    a memory management unit of an integrated circuit device;
    a memory protection unit of the integrated circuit device; and
    a debug module for the at least one integrated circuit device.

5. The system performance control component of claim 2, wherein the address comparison component is arranged to hold the address match signal constant during periods of no memory accesses activity by the at least one signal processing component.

6. The system performance control component of claim 2, wherein the performance configuration component arranged to:
    receive the at least one address match signal output by the at least one address comparison component; and
    configure at least one system performance parameter based at least partly on the address match signal output by the at least one address comparison component.

7. The system performance control component of claim 6, wherein the performance configuration component is arranged to configure at least one system performance parameter to:
    improve performance of at least a part of an integrated circuit device, if the address match signal comprises a first indication; and
    reduce power consumption of at least a part of the integrated circuit device, if the address match signal comprises a second indication.

8. The system performance control component of claim 1, wherein the system performance control component is arranged to configure at least one system performance parameter based at least partly on:
    whether the indication of an address of a memory access matches the at least one address value;
    whether the indication of an address of a memory access is less than the at least one address value;
    whether the indication of an address of a memory access is greater than the at least one address value;
    whether the indication of an address of a memory access is within an address range at least partly defined by the at least one address value; and whether the indication of an address of a memory access is outside an address range at least partly defined by the at least one address value.

9. The system performance control component of claim 1, wherein the system performance control component is arranged to configure at least one system performance parameter from a group comprising at least one of:
- at least one frequency control parameter for at least one clock signal within the integrated circuit device;
- at least one clock gating control parameter;
- at least one power supply voltage level control parameter;
- at least one power supply gating control parameter; and
- at least one power mode selection parameter.

10. The system performance control component of claim 1, wherein the indication of an address of a memory access performed by the at least one signal processing component comprises an indication of an address of at least one of:
- a data fetch performed by the at least one signal processing component; and
- an instruction fetch performed by the at least one signal processing component.

11. The system performance control component of claim 1 implemented within an integrated circuit device comprising at least one die within a single integrated circuit package.

12. The system performance control component of claim 11 implemented within at least one of:
- a microcontroller integrated circuit device;
- a microprocessor integrated circuit device; and
- a system on chip, SoC, integrated circuit device.

13. A method of configuring at least one system performance parameter within a signal processing system; the method comprising:
- receiving an indication of an address of a memory access performed by at least one signal processing component;
- comparing the received indication of an address of a memory access to at least one address value;
- outputting an address match signal comprising an indication of whether the received indication of the address of the memory access is a match to a criteria;
- monitoring the address match signal to determine a duty cycle for the address match signal; and
- configuring at least one system performance parameter based at least partly on the determined duty cycle for the address match signal.

14. The system performance control component of claim 3, wherein the at least one address comparison component forms a part of at least one of:
- a memory management unit of an integrated circuit device;
- a memory protection unit of the integrated circuit device; and
- a debug module for the at least one integrated circuit device.

15. The method of claim 13, wherein to the criteria is at least one of a group comprising:
- whether the indication of an address of a memory access matches the at least one address value;
- whether the indication of an address of a memory access is less than the at least one address value;
- whether the indication of an address of a memory access is greater than the at least one address value;
- whether the indication of an address of a memory access is within an address range at least partly defined by the at least one address value; and
- whether the indication of an address of a memory access is outside an address range at least partly defined by the at least one address value.

16. The method of claim 15, wherein the address comparison component comprises at least one programmable register for storing the at least one address value.

17. The method of claim 15, wherein the address comparison component is arranged to hold the address match signal constant during periods of no memory accesses activity by the at least one signal processing component.

18. The method of claim 15, further comprising:
- receiving the at least one address match signal output by the at least one address comparison component; and
- configuring at least one system performance parameter based at least partly on the address match signal output by the at least one address comparison component.

19. The system method of claim 15, further comprising:
- improving performance of at least a part of an integrated circuit device, if the address match signal comprises a first indication; and
- reducing power consumption of at least a part of the integrated circuit device, if the address match signal comprises a second indication.

20. The method of claim 13, further comprising:
- configuring a system performance parameter from a group comprising at least one of:
- a frequency control parameter for at least one clock signal within the integrated circuit device;
- a clock gating control parameter;
- a power supply voltage level control parameter;
- a power supply gating control parameter; and
- a power mode selection parameter.

* * * * *